March 4, 1952 L. WASSON 2,588,186
CONTROL DEVICE
Filed Nov. 13, 1945 2 SHEETS—SHEET 1

Inventor:
Loerwood Wasson.

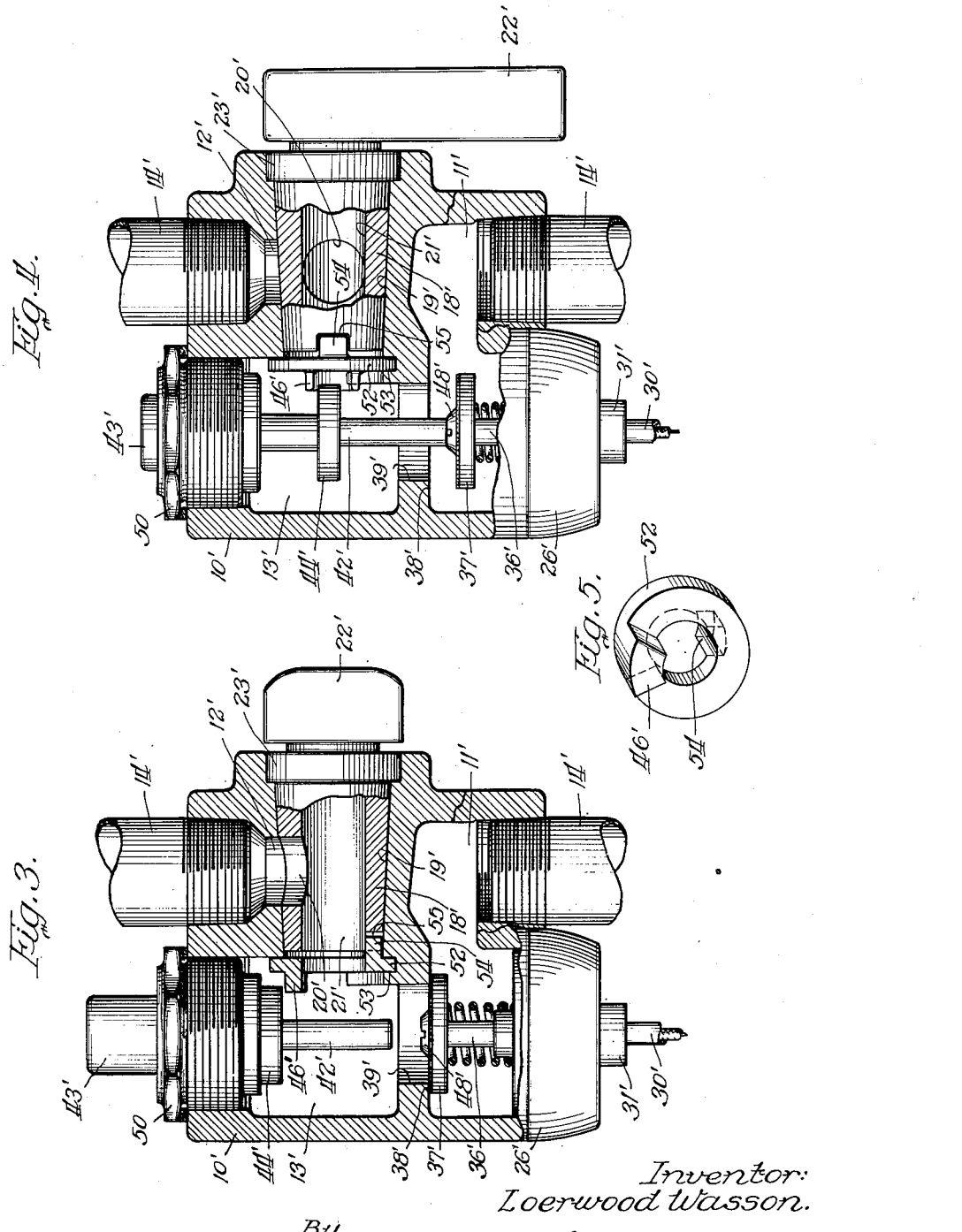

Patented Mar. 4, 1952

2,588,186

UNITED STATES PATENT OFFICE 2,588,186

CONTROL DEVICE

Loerwood Wasson, Wauwatosa, Wis., assignor to Milwaukee Gas Specialty Company, Milwaukee, Wis., a corporation of Wisconsin Application November 13, 1945, Serial No. 628,291

7 Claims. (Cl. 137—139)

This invention relates, in general, to control devices, and has particular relation to control devices which have a valve or other controlling member for controlling the supply of fuel to a burner, and a thermocouple safety shutoff for automatically shutting off the supply of fuel to the burner when a flame such, for example, as a pilot flame is extinguished.

While the particular devices which I shall describe hereinafter in connection with the drawings are combined thermocouple safety shutoff and manual control valves, it is to be understood that the invention is not limited to such devices but may be employed in combined thermocouple safety shutoff, manual control valve and heater thermostat devices and in all similar devices.

Due to the minute character of the maximum E. M. F. that can be generated by the heat of a pilot light or other flame on a thermocouple and the inability of the thermoelectric current to actuate the safety shutoff means to open or operating position, thermocouple safety shutoff and control devices of the type to which this invention particularly appertains usually require reset or cocking means for resetting or cocking the armature to attracted position and the valve or other safety shutoff to open or operating position.

Unless means is provided for assuring that the supply of fuel to the burner is shut off during the resetting operation and until the pilot is lighted and has heated the thermocouple sufficiently to hold the shutoff valve in open position, fuel may pass to the burner and collect unburned. This unburned fuel presents the danger of asphyxiation and possible explosion when a flame is applied to light the pilot burner.

One of the main objects of the present invention is to provide in conjunction with a reset member mounted for resetting operation and a valve member having movement to open and closed positions, interlock means actuated into position to obstruct and prevent resetting operation of the reset member by movement of the valve member to open position and out of obstructing position to permit resetting movement of the reset member by movement of the valve member to closed position.

Another object of the invention is to provide in a device of the class described thermoelectric safety means, reset means for resetting the thermoelectric safety means, a valve plug rotatable to open and closed positions, and interlock means mounted at the inner end of the valve plug and connected to turn with said plug; the interlock means being positioned to obstruct and prevent operation of the reset means when the valve plug is in open position and to permit resetting operation of the reset means when the valve plug is in closed position.

Another object of the invention is to provide interlock means having mounting and connection with the valve plug whereby to absorb force due to actuation of the reset member while the valve plug is open and prevent loosening of the valve plug by such force; more particularly, interlock means having mounting and connection for absorbing the force referred to without imposing the same on the valve member.

Another object of the invention is to provide a control body having an inlet, an outlet, and a chamber intermediate the inlet and outlet, a reset member having reciprocatory movement in the intermediate chamber, a valve member mounted in the valve body for movement to open and closed positions, and interlock means disposed in the intermediate chamber and operable to prevent resetting operation of the reset means when the valve member is in open position and to permit resetting operation of the reset means when the valve member is in closed position.

Another object of the invention is to provide an interlocking ring mounted on the control or valve body at the inner end of the rotatable valve plug and connected to turn with the valve plug for the purposes set forth, and which is operable to absorb force due to actuation of the reset means while the valve plug is open without imposing same on the valve plug.

Another object of the invention is to provide an improved form of interlock having various features of novelty and various advantages and which is particularly characterized by its simplicity in construction, its relatively few parts, its economy in manufacture and its effectiveness in use.

Further objects and advantages of the invention will be apparent from the following detailed description, taken in connection with the accompanying drawings in which:

Figure 1 is an axial section through a thermocouple safety shutoff and manual control valve, partially in elevation and partially schematic, and showing the interlock of the present invention embodied therein; the manual valve member being in open position;

Figure 2 is a view similar to Figure 1, with the schematic portion omitted and showing the manual valve member in closed position;

Figure 3 is a view similar to Figure 2 through a modified form of device embodying the present invention, with the manual valve member in open position;

Figure 4 is a view similar to Figure 3, showing the manual valve member in closed position; and Figure 5 is a perspective view of the interlocking ring shown in Figures 3 and 4.

The combined thermocouple safety shutoff and valve or control device shown in Figures 1 and 2 of the drawings comprises a valve or control body 10 having an inlet 11, an outlet 12, and an intermediate chamber 13. Contiguous sections of a fuel supply pipe 14 are connected to the inlet 11 and outlet 12, the section connected to the outlet 12 leading to a burner shown fragmentarily and more or less schematically at 15 for supplying gaseous fuel thereto.

Figure 1 shows fragmentarily and schematically a pilot burner 16 in juxtaposition to the main burner 15. The pilot burner 16 is intended to provide a pilot light for lighting the main burner 15. A pilot supply pipe 17, which may be suitably connected, for example, to the valve body 10, supplies gaseous fuel to the pilot burner 16.

The manual valve is shown in the form of a hollow and tapered or truncated conical valve plug 18, seated for rotation in a corresponding conical bore 19 in the valve body 10. The valve plug 18 has a port or opening 20 opening laterally from the hollow interior 21 of the valve plug. The hollow interior 21 opens inwardly from the inner end of the plug, as shown. In Figure 1 the plug 18 is in open position, with the port 20 positioned to supply fuel to the main burner 15 through the outlet 12 and fuel supply pipe 14. In Figure 2 the port 20 is in closed position substantially 90° from the position shown in Figure 1.

For the purpose of turning the valve plug 18 to its open and closed positions the outer end of the plug 18 is provided with a handle 22. The handle 22 may, of course, be of any other suitable or preferred form. The handle 22 or the outer surface of the part 23 may have "On" and "Off" markings (not shown) for indicating the "On" and "Off" positions of the valve plug 18; also, where the pilot supply pipe 17 is connected to the valve body 10 and the supply of fuel for the pilot burner 16 is controlled by the valve plug 18, with a "Pilot" marking for indicating the "Pilot" position of the valve plug 18.

The electromagnet and the circuit connections between the coil thereof and the thermocouple leads may be of the type more fully illustrated and described, for example, in Clarence Wantz Patent No. 2,318,823, May 11, 1943. Suffice it, for purposes of the present disclosure, to say that the electromagnet comprises a generally U-shaped magnet frame 25 positioned within a magnet housing 26 and a coil 27 wound around the legs of the magnet frame.

A thermocouple, indicated at 28, is placed in position so that the hot junction thereof will be heated by the pilot flame 29 as long as the pilot flame is burning. The thermocouple and leads therefor may be similar to the thermocouple and leads more fully disclosed in Oscar J. Leins Patent No. 2,126,564, August 9, 1938, or the thermocouple and leads may be of any other suitable or preferred form. The thermocouple shown in the drawings is of the concentric type comprising an outer tubular thermocouple element and an inner thermocouple element therein. The thermocouple lead 30 shown in the drawings is also of the concentric type comprising an outer tubular lead conductor connected in circuit with the outer tubular thermocouple element and an inner lead conductor disposed within the outer lead conductor and connected in circuit with the inner thermocouple element. A suitable connection, and preferably a quick detachable connection which may be of the form illustrated and described in the above identified Wantz patent, is provided at 31 between the coil of the electromagnet and the thermocouple leads.

The electromagnet has an armature 34 disposed within the housing 26 and adapted to be held in attracted position against the pole ends of the magnet frame 25 as long as the thermocouple 28 is energized by the heat of the pilot flame 29 or other flame on the hot junction 35 of the thermocouple. The armature 34 is connected, for example, by a stem 36 to the safety shutoff valve member 37 which, when the pilot flame 29 is extinguished, is actuated to closed position or seating engagement with valve seat 38 surrounding the inlet side of port 39 to shut off the supply of fuel to the main burner 15.

For the purpose of resetting the armature 34 to attracted position and the safety shutoff valve 37 to open position, a reset member is mounted for reciprocatory movement, for example, in the valve body 10. The reset member comprises a reciprocatory reset stem 42 coaxial with the armature 34, safety shutoff valve 37 and stem 36. The reset stem 42 has at its outer end a reset button 43 which is adapted to be engaged with the fingers and pressed inwardly in resetting the device. Operable within the intermediate chamber 13 is an abutment shown in the form of an integral laterally extending annular flange 44 on the stem 42. A coiled spring shown at 45 maintains the reset button 43 and stem 42 in their outwardly projected position, and returns same to said position after each resetting operation.

To prevent resetting the armature 34 to attracted position and the safety shutoff valve to open position when the rotatable valve plug 18 is in open position, I provide the inner end of the plug 18 with a prong or interlock member 46 which extends into the zone of operation of the reset means. In this particular form of the invention the prong 46 cooperates with the flange or abutment 44 and, being integral with the inner end of the valve plug 18, turns with the turning movement of the plug. When the valve plug 18 is in open position as shown in Figure 1, the prong 46 cooperates with the abutment 44 to obstruct and prevent resetting operation of the reset stem 42. When the valve plug 18 is in closed position as shown in Figure 2, the prong 46 is sufficiently clear of the abutment 44 to allow resetting operation of the reset stem 42.

The following sequence is followed in operating the device shown in Figures 1 and 2:

The prong 46 and abutment 44 providing within the intermediate chamber 13 an interlock which prevents resetting operation of the reset stem 42 when the valve plug 18 is in open position as shown in Figure 1, the handle 22 is grasped and manipulated to turn the valve plug 18 to closed position as shown in Figure 2. This shuts off the supply of fuel to the main burner. The reset button 43 is then engaged by the thumb or finger and pressed inwardly and, by abutting engagement of the inner end of the stem 42 with the safety shutoff valve 37 or head or bushing 48 adjacent the same, moves the armature 34 to attracted position and the safety shutoff valve 37 to open position.

Upon igniting the pilot burner 16 which is connected to receive a pilot supply of fuel at this time, the pilot flame 29, by heating the hot junction 35 of the thermocouple 28, energizes the electromagnet sufficiently to hold the armature 34 in attracted position and the safety shutoff valve 37 open. When the reset button 43 is released, the spring 45 moves the button and reset stem to their outwardly projected position. The main burner 15 may then be turned "On" or controlled by turning the valve plug 18 to full or partially open position; full open position being shown in Figure 1.

If the pilot flame 29 is extinguished, the armature 34 is released and the safety shutoff valve 37 is moved to closed position as shown in the drawings, to shut off the supply of fuel to the main burner; also preferably the supply of fuel for the pilot burner. In resetting the device after extinguishment of the pilot flame 29 the sequence above set forth is followed.

Except for the form of the interlock and the mounting of the reset stem 42' in a nut 50 screwed in the valve body 10', the device shown in Figures 3 and 4 is like the device shown in Figures 1 and 2, and similar parts are designated by primed reference characters corresponding to the reference characters used in Figures 1 and 2.

In Figures 3 and 4 the interlock prong 46', instead of being made integral with the inner end of the valve plug 18' as in Figures 1 and 2, is formed integral with and extends from a separate interlocking ring 52. The ring 52 is mounted at 53 in the valve body 10' adjacent the intermediate chamber 13' and is connected, for example, by means of a dog connection to turn with the valve plug 18'. The dog connection comprises an integral lug 54 struck out from the ring 52 and engaging in a notch 55 in the inner end of the valve plug 18'.

The operation of the device shown in Figures 3 and 4 is the same as described in connection with Figures 1 and 2 and, therefore, the operating sequence will not be repeated. The interlocking ring 52 with its mounting in the valve body at 53 and its connection with the valve plug 18' turns with the plug 18' and, at the same time, absorbs force due to actuation of the reset stem 42' while the valve plug 18' is open. Such force is therefore not imposed on the valve plug. This prevents loosening or other deleterious effects on the valve plug 18' due, for example, to actuation of the reset button 43' with the valve plug 18' in open position.

The embodiments of the invention shown in the drawings are for illustrative purposes only, and it is to be expressly understood that the drawings and the accompanying specification are not to be construed as a definition of the limits or scope of the invention, reference being had to the appended claims for that purpose.

I claim:

1. In combination, an armature, an electromagnet for holding said armature in attracted position, a control body having a passage, a reset member for resetting the armature to attracted position and mounted for reciprocatory movement in said body, said reset member comprising a reset stem having an abutment thereon, a hollow tapered valve plug rotatable in said body about an axis substantially normal to the path of movement of the reset member and having a port movable to open and closed positions relative to the passage in the control body by rotation of the valve plug, said valve plug having an end in proximity to said reset member, an interlocking ring mounted on said body at the end of the valve plug in proximity to the reset member and connected to turn with the valve plug, and an abutment extending from said ring and positioned in the path of movement of the abutment on the reset member to prevent resetting movement of the reset member when the valve plug is open, the abutment extending from said ring being positioned to permit resetting movement of the reset member when the valve plug is closed.

2. In combination, an armature, an electromagnet for holding said armature in attracted position, a control body having an inlet passage, an outlet passage, and a chamber intermediate said inlet and outlet passages, a reset member for resetting the armature to attracted position and mounted for reciprocatory movement in said body and comprising a stem having an abutment operating in said intermediate chamber, a hollow tapered valve plug rotatable in said body about an axis substantially normal to the path of movement of the reset member and having a port movable into and out of cooperation with one of said passages by rotation of the valve plug, an interlocking ring mounted on said body adjacent the intermediate chamber and connected to turn with the valve plug, and an abutment extending into the intermediate chamber from said ring and positioned in the path of movement of the abutment on the reset member to prevent resetting movement of the reset member when the valve plug is open, the abutment extending from said ring being positioned to permit resetting movement of the reset member when the valve plug is closed.

3. In combination, an armature, an electromagnet for holding said armature in attracted position, a reset member mounted for resetting movement for resetting said armature to attracted position, a control body having a passage, a valve plug rotatable in said control body and having a port movable into and out of cooperation with said passage, said valve plug having an end in proximity to said reset member, an abutment on said reset member, a resetting ring at the end of the valve plug in proximity to said reset member and having dog connection with said plug, and an abutment extending from said ring toward said reset member for cooperation with the abutment on said reset member to prevent resetting operation of said member when the valve plug is in open position.

4. In combination, an armature, an electromagnet for holding said armature in attracted position, a reset member mounted for resetting movement for resetting said armature to attracted position, a control body having a passage, a valve plug rotatable in said control body and having a port movable into and out of cooperation with said passage, said valve plug having an end in proximity to said reset member, an abutment on said reset member, a resetting ring at the end of the valve plug in proximity to said reset member and having dog connection with said plug, and an abutment extending from said ring toward said reset member for cooperation with the abutment on said reset member to prevent resetting operation of said member when the valve plug is in open position, said resetting ring absorbing force due to pressing the reset member while the valve plug is in open position and the abutment on said ring being positioned to permit resetting operation of said reset member when the valve plug is in closed position.

5. In combination, a thermoelectric device comprising an electromagnet having coil means and a core, an armature, a thermocouple connected in circuit with said coil means for producing a thermoelectric current to hold said armature in attracted position, a first valve member connected to said armature and adapted to be held in open position by the armature when the armature is in attracted position and movable to closed position when the armature is released from the electromagnet, a reset member for resetting the armature to attracted position and said first valve member to open position, an abutment on said reset member, a valve body having a passage, a hollow tapered valve plug rotatable in said valve body about an axis substantially normal to the axis of movement of the reset member and having a port movable into and out of cooperation with said passage by rotation of the valve plug, said valve plug having an end in proximity to said reset member, an interlocking ring mounted on said body at the end of the valve plug in proximity to said reset member and connected to turn with the valve plug, and an abutment extending from said ring and positioned in the path of movement of the abutment on the reset member to prevent resetting movement of the reset member when the valve plug is open, the abutment extending from said ring being positioned to permit resetting movement of the reset member when the valve plug is closed.

6. In a device of the class described, in combination, a valve body, a valve plug rotatable to open and closed positions in said valve body, interlock means connected to the inner end of said valve plug for rotation therewith to interlock position when the valve plug is open and to released position when the valve plug is closed, thermoelectric safety means comprising a shut-off valve, an armature connected to said shut-off valve and coaxial therewith, and an electromagnet operable, when energized, to hold said armature in attracted position and said shut-off valve in open position, said electromagnet, when deenergized, releasing said armature for movement to retracted position and said shut-off valve for movement to closed position, reset means coaxial with said shut-off valve and armature for resetting said shut-off valve to open position and said armature to attracted position, the common axis of said reset means, shut-off valve and armature being disposed at substantially right angles to the axis of the valve plug and spaced inwardly of the inner end of the valve plug and the connected interlock means sufficiently to position the reset means for movement clear of said valve plug and interlock means, and an abutment carried by said reset means and extending laterally therefrom for cooperation with said interlock means to prevent resetting operation of said reset means when the valve plug is in open position and the interlock means is in interlock position, said interlock means being clear of said abutment to permit resetting operation of the reset means when the valve plug is closed and the interlock means is in released position.

7. A device according to claim 6 wherein the interlock means comprises an interlocking ring mounted on the valve body at the inner end of the valve plug in proximity to the reset means and connected to turn with the valve plug.

LOERWOOD WASSON.

REFERENCES CITED

The following references are of record in the file of this patent:

UNITED STATES PATENTS

| Number | Name | Date |
|---|---|---|
| 2,213,844 | Mantz | Sept. 3, 1940 |
| 2,318,136 | Alfrey | Jan. 13, 1941 |
| 2,318,823 | Wantz | May 11, 1943 |
| 2,328,642 | Green | Sept. 7, 1943 |
| 2,361,944 | Jackson | Nov. 7, 1944 |
| 2,361,945 | Jackson | Nov. 7, 1944 |
| 2,363,063 | Hildebrecht | Nov. 21, 1944 |
| 2,372,537 | Wantz | Mar. 27, 1945 |
| 2,409,947 | Mantz | Oct. 22, 1946 |